United States Patent
Milewski et al.

(10) Patent No.: US 6,917,010 B2
(45) Date of Patent: Jul. 12, 2005

(54) METHOD FOR BRAZING AND THERMAL PROCESSING

(75) Inventors: John O. Milewski, Santa Fe, NM (US); Vivek R. Dave', Los Alamos, NM (US); Dane Christensen, Livermore, CA (US); Robert W. Carpenter, II, Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 192 days.

(21) Appl. No.: 10/425,288

(22) Filed: Apr. 29, 2003

(65) Prior Publication Data

US 2003/0201252 A1 Oct. 30, 2003

Related U.S. Application Data

(63) Continuation-in-part of application No. 09/776,045, filed on Feb. 1, 2001, now abandoned.

(51) Int. Cl.$^7$ .............................................. B23K 26/00
(52) U.S. Cl. .................................................. 219/85.12
(58) Field of Search ............................. 219/85.1, 85.12, 219/85.13; 228/102, 103; 359/838; 250/492.1, 504 R

(56) References Cited

U.S. PATENT DOCUMENTS

| | | | | |
|---|---|---|---|---|
| 3,981,705 A | | 9/1976 | Jaeger et al. ..................... 65/2 |
| 4,456,811 A | * | 6/1984 | Hella et al. ............. 219/121.85 |
| 4,491,463 A | * | 1/1985 | Weinstein et al. ............. 65/382 |
| 4,849,640 A | * | 7/1989 | Kruishoop ................ 250/492.1 |
| 5,586,714 A | | 12/1996 | Curicuta et al. .......... 228/122.1 |
| 5,889,626 A | | 3/1999 | Fuse et al. ................... 359/858 |
| 6,054,375 A | | 4/2000 | Quick ......................... 438/535 |
| 6,221,068 B1 | * | 4/2001 | Fried et al. ..................... 606/8 |
| 6,731,421 B2 | * | 5/2004 | Willden ....................... 359/234 |
| 6,752,501 B2 | * | 6/2004 | Willden ....................... 359/838 |

FOREIGN PATENT DOCUMENTS

JP          362254441          6/1987

\* cited by examiner

*Primary Examiner*—Jonathan Johnson
(74) *Attorney, Agent, or Firm*—Mark N. Fitzgerald

(57) ABSTRACT

The present invention includes a method for brazing of two objects or heat treatment of one object. First, object or objects to be treated are selected and initial conditions establishing a relative geometry and material characteristics are determined. Then, a first design of an optical system for directing heat energy onto the object or objects is determined. The initial conditions and first design of the optical system are then input into a optical ray-tracing computer program. The program is then run to produce a representative output of the heat energy input distribution to the object or objects. The geometry of the object or objects, material characteristics, and optical system design are then adjusted until an desired heat input is determined.

8 Claims, 4 Drawing Sheets

METHOD FOR BRAZING AND THERMAL PROCESSING

RELATED APPLICATIONS

This application is a continuation-in-part of application Ser. No. 09/776,045, filed on Feb. 1, 2001 now abandoned, by Milewski et al, incorporated herein by reference for all purposes.

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to a method for brazing or heat treating of metals or ceramics using non-imaging infrared energy concentration, and, more particularly, the invention relates to the determination of an optimized energy deposition of non-imaging infrared energy for brazing or heat treatment given a variable set of initial conditions.

BACKGROUND OF THE INVENTION

The brazing or thermal treatment of one or more objects becomes complicated when those objects are small or are brazed or thermally treated by conventional methods. In industrial applications, brazing or thermal treatment that requires heating within a furnace is excessively time consuming and thus drives up the cost of processing. Small diameter tubes and parts with complex shapes are difficult to braze or thermally treat in-situ since it is difficult to heat small target areas with any precision using current induction heating or furnace heating methods. The heat as applied through these methods cannot be precisely localized and thus will invariably affect surrounding components. Attempts at using direct heating from lasers or electron beams are inefficient or detrimental in that they heat from one direction only, leading to overheating one side of a joint to be brazed while under-heating the opposite side.

The process variables that must be considered and optimized when resolving these problems include: recognizing the inherent geometry of the target objects, taking into account the target materials involved, accounting for the surrounding physical environment in which the objects reside, selecting an appropriate heat energy source, and designing an apparatus to facilitate an efficient path to distribute the energy on the target objects.

Therefore, there is a long felt need for a method of brazing or heat treating metal or ceramic components that can optimize all of the integrated relational aspects involved when dealing with small components or those that are located in hard to reach areas. Industrial applications that would benefit from a solution to these problems include, but are not limited to, field retrofit of small tubing and tubulation hardware within commercial jet turbine engines, electronic component manufacturing, and medical equipment using capillary tubing.

The method of the present invention overcomes the aforementioned obstacles through use of a computerized method to account for all the integrated relational aspects involved with in-situ brazing or heat treatment of target components. Through an iterative procedure, either internal to the computer program or external by re-running the simulation with changed variables, an optimized solution can be reached that allows for the construction of a unique apparatus for the most efficient brazing or heat treatment operation for a given task.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the purposes of the present invention, as embodied and broadly described herein, the present invention includes a computer implemented method for brazing of two objects or heat treatment of one object. First, object or objects to be treated are selected and initial conditions establishing a relative geometry and material characteristics are determined. Then, a first design of an optical system for directing heat energy onto the object or objects is determined. The initial conditions and first design of the optical system are then input into a optical ray-tracing computer program. The program is then run to produce a representative output of the heat energy input distribution to the object or objects. The geometry of the object or objects, material characteristics, and optical system design are then adjusted until a desired heat input is determined.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

Figure 1:
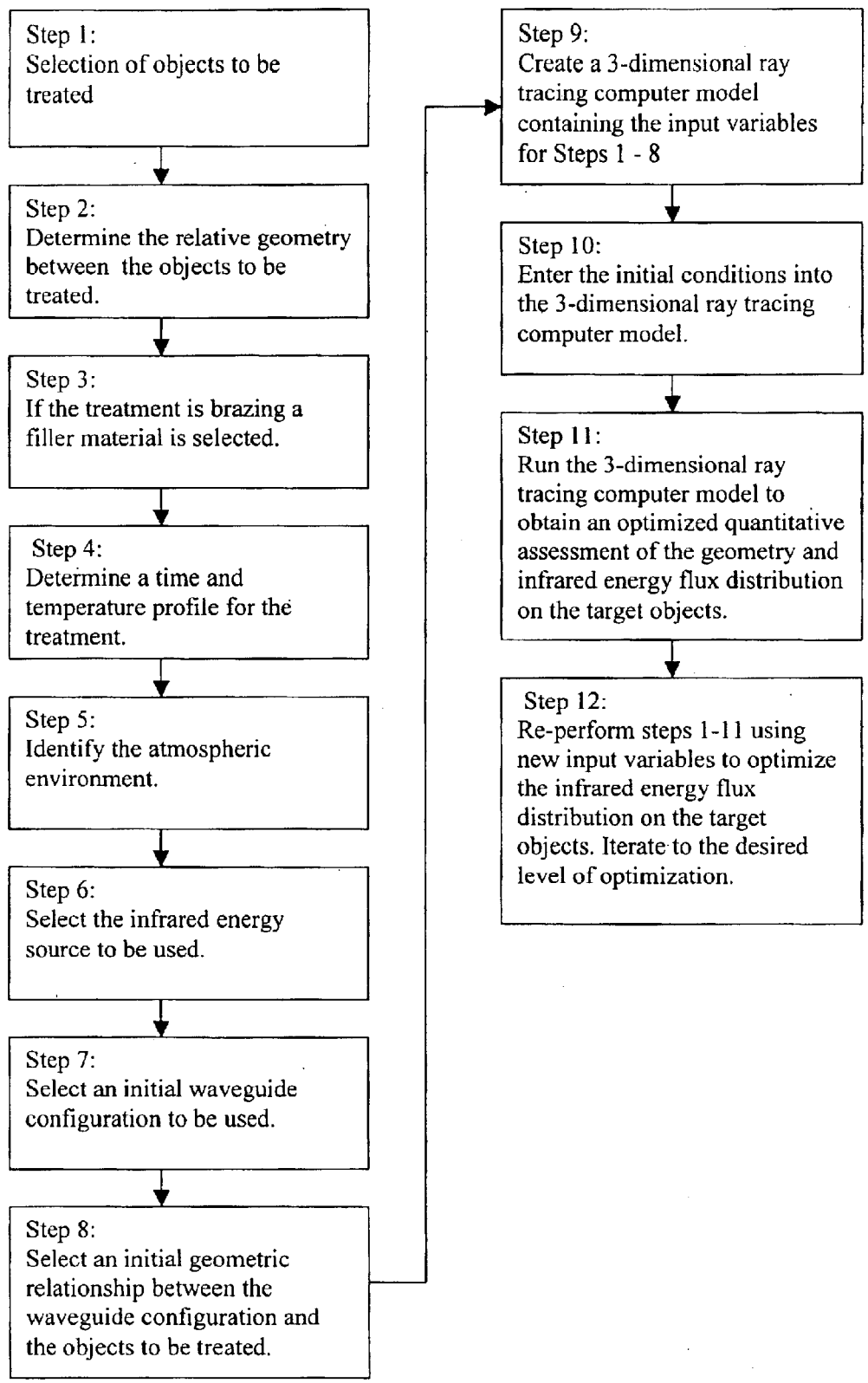
FIG. 1 is an illustrative flowchart of the present method invention.

In the method of the present invention, non-imaging infrared energy is optimally concentrated by construction and use of a computer model that ascertains precise design definition and relative locations for a reflecting waveguide or waveguides (herein collectively referred to as waveguides) used to tailor the spatial distribution of infrared energy striking each targeted unit area of an object or objects (herein collectively referred to as objects) located in proximity to the reflecting waveguides. Placement of the objects within optimally shaped reflecting waveguides enable precisely tailored application of heat needed for brazing or thermal treatment (herein collectively referred to as treatment) of complex shapes, small localized areas, or small parts such as small diameter tubes.

The geometric parameters of the target objects to be treated, the reflecting waveguides that serve as optical concentrators, and the infrared energy source are modeled. The size, location, and orientation of each component are adjustable within each model. The infrared energy source model can represent the infrared energy source as either a distributed collimated beam, formed by an array of point sources, or as a localized focused beam point source with adjustable divergence and energy.

The target model and the energy source model are then input to a computer program, such as OptiCAD™, for processing on a computer to output a distribution of infrared rays, each of which carries a specific amount of energy that is deposited upon the surfaces of the reflecting waveguides and the target objects.

Surface characteristics of the target objects and waveguides are modeled to include light absorptive features of the ray impingement and energy deposition. Surface reflective features act to direct the unabsorbed remainder of energy back into three-dimensional space, where it is either lost or returned within the reflecting waveguides for further input onto the target objects. The amounts of energy absorbed and reflected are modeled in three dimensions per unit area of the modeled surfaces.

In a preferred embodiment, non-sequential ray tracing within the model is used, allowing for modeling of rays impinging upon any surface in any order. As the rays propagate throughout the model, the rays deposit energy as they contact surfaces until they lose substantially all of their original energy and are then terminated from consideration within the model. To obtain an adequate statistical representation of energy propagation, typically 10,000 rays are traced over a distribution of space defined by the infrared energy source. In these models, the reflective surfaces of the reflecting waveguides are defined to have a reflective coefficient associated with the particular metal, e.g., a reflective coefficient of 98% for copper. Energy absorption is not typically recorded for the reflecting waveguide surfaces, although it may be recorded to optimize the reflector design, e.g., to minimize the waveguide size.

The sections of a target objects, such as a tube to be joined, are defined in the model as possessing energy absorption values and reflective values, consistent their inherent material makeup, which may be found through experimentation or provided from a data book that provides optical properties of materials. For example, typical for the Nd:YAG wavelength impinging directly upon stainless steel, an energy absorption value of 35%, and conversely, a reflective value of 65%, is assigned. Therefore, energy impinging upon the tube section can reflect back onto the walls and back onto the tube multiple times, allowing multiple absorption opportunities.

Within the three-dimensional model, a mesh of absorptive detector units which record the location and intensity of energy deposited (not reflected) for all impinging rays lies beneath the partially reflective walls of the tube geometry.

Braze filler "preform" geometry does not necessarily have to be considered in the model. Angle-dependent absorption, beam polarization, and scattering are also considered to have only secondary effects and to make little contribution to the accuracy of the model.

Because the method is primarily for the purpose of establishing a desired distribution of incident radiant energy at a selected thermal profile onto an absorbing surface, the issues of efficiency of collection and efficiency of transmission are not as significant in calculating the optimal configuration of the reflecting waveguides or placement of the target objects.

FIG. 1 is a flowchart of the method. The method begins with the selection of the objects to be treated (Step 1) and their relative geometry to each other (Step 2). This relationship is denoted mathematically for input into a 3-dimensional ray tracing computer program that will ultimately produce an optimum solution for the treatment. Step 3 involves the selection of a filler material if the treatment is brazing. Processing consumables such as flux and active or inert shielding gaskets may be employed as needed.

A time and temperature profile (Step 4) needed for the treatment is determined from considerations well known to persons of ordinary skill in the art, considering such things as the brazing or soldering materials to be used, the melting range of the materials, the mass or geometry of the target objects, and if applicable, the clearance or gap available for the braze material to flow into during the process. To aid in this determination approximate engineering calculations, finite element modeling, or other numerical analysis techniques may be used. An alternative method for determining the time and temperature profile is use of an optimization method, such as genetic algorithms, to systematically alter parameters in the flux distribution until a desired thermal profile is obtained.

Step 5 is the identification of the atmospheric environment in which the treatment will take place. This environment will have a direct effect on the outcome of the treatment solution. In order to control the environment and provide a concise measurement of this variable a processing chamber, temperature sensors, and control systems may be used. However, the need for this step depends upon the target object materials and the quality of work required.

A heat source to be used in the treatment is selected in Step 6. Coherent infrared energy sources, such as lasers, are preferred as they are commercially available in many different sizes and strengths, and can be easily propagated and focused as required. Any number of infrared energy sources may be utilized, such as solid state, gas, or diode lasers. Commercially available gas lasers are a preferred source for applications requiring large amounts of beam power. Solid state and diode lasers are suggested for applications that require improved coupling of the inherent characteristic wave lengths to target material characteristics, and the high average power and quality in consideration of the relatively compact size of the laser systems. Relatively compact laser systems are particularly useful for joining of small target objects, where optical fiber and collimated beam delivery allows flexible and remote configurations. Direct diode lasers are available with increased power capability, lower relative cost, longer lifetimes, and very compact sizes. The inherent shortcomings of diode lasers, with respect to beam quality and focal spot size limitations, are offset by optimization of waveguide placement as determined through the present invention method. Other infrared energy sources offer the lowest cost options as portable suppliers of energy.

Determination of associated optics and beam delivery systems are optional as the character of the energy source may be considered within the model as either a variable or constant input condition.

Figure 2:
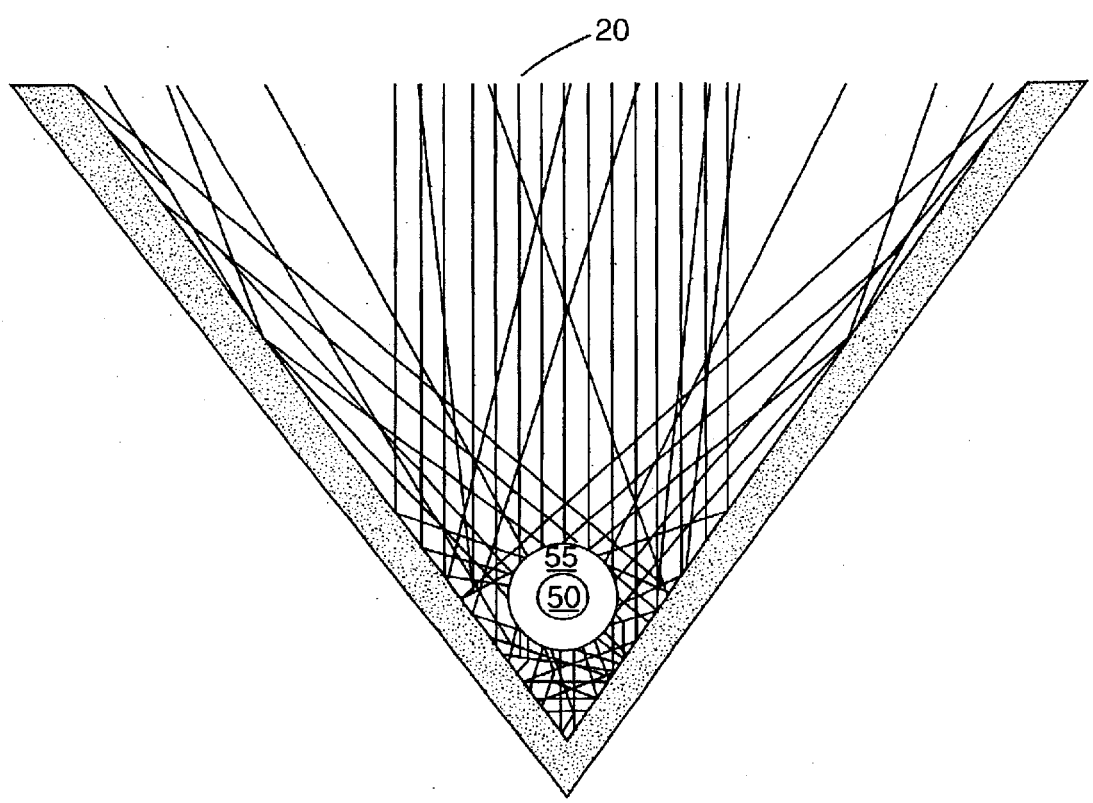
FIG. 2 is a pictorial illustration of the many combinations of infrared energy ray paths and correlating energy deposition to a target object using a V-shaped waveguide.

The initial design of an apparatus (waveguide) to facilitate an efficient means to distribute the energy on the target objects is formed in Step 7. The inherent characteristics of the infrared energy, such as wave lengths, frequencies, pulse widths, beam divergence, focal spot size and peak power, are considered along with the geometric configuration of target objects in determining an optimal design of the reflecting waveguides to be used. The waveguide acts as an optical concentrator by directing both the infrared energy from the energy source and the energy that reflects off the target objects. Thus, the re-directed energy is redistributed and "recycled" back onto target objects by the multiple reflections and multiple absorption events. FIG. 2 pictorially illustrates these multiple reflection and absorption events when an infrared energy source is targeted on an object through the use of a V-shaped waveguide.

The approximated configuration and preliminary material selection for a reflecting waveguides are selected by using a variety of criteria. Depending upon the optimization criteria (system cost, process speed) for the particular type of treatment to be performed, the selection criteria may include: size and shape of the target objects; commercial availability of the appropriate reflector materials; shapes that are attainable through common forming and machine tooling; shapes that are attainable as free forms through methods such as sculpting, casting or spraying; cost and complexity of the reflector and fabrication methods available; knowledge of shapes of lenses, reflection and non-imaging optics to provide the starting point for further reiterations; and availability of algorithms for a particular shape to optimize the shape in further iterations.

The reflecting waveguides are shaped as prescribed by resultants of this method to provide precise, tailored, illumination, heating and/or melting of braze filler. The shape of the reflecting waveguides may be optimized in subsequent method steps through iterative means, i.e., a shape and position are modeled or tested, then adjusted to further improve the distribution of the energy pattern and contact with the objects being joined.

In Step 8 the initial position of the objects to be treated relative to the reflecting waveguides is selected. This position is selected by consideration of the size and shape of the objects, cost and complexity of the positioning equipment required, knowledge of shapes of lenses and mirrors, reflective and non-imaging optics to provide the starting point for the further iterations, and availability of algorithms for a particular shape to optimize the position of the objects having that shape in further iterations.

Step 9 is the method of creating a computer model for optimizing the infrared energy flux, reflecting waveguides configuration, position of the target objects, and any other selected variables. The modeling is performed through the use of a 3-dimensional CAD optical design program with a non-sequential optical ray tracing algorithm, such as OptiCAD™. The computer model generated using this software allows for incorporation of all the aforementioned variables necessary to produce an optimized solution for treatment of any presented task. In addition, models, such as ABAQUS™ which perform finite element analysis of heat flow can be used to evaluate the selection of reflector shape and position of the objects to be thermally treated or joined.

Step 10 consists of entering the initial conditions determined from Steps 1–8 into the 3-dimensional CAD optical design program. The program is then run in the computer in Step 11. The output includes a quantitative assessment of the energy flux distribution on the target objects. These output results may be displayed by graphing the spatial heat flux data using commercially available computer software such as Microsoft EXCEL™. Microsoft EXCEL™ can also be used to calculate the total energy absorption by the target objects and determine the uniformity of surface illumination.

The results are reviewed to determine if a proper thermal profile exists to perform the desired treatment. If not, Step 12 is performed, where the model is run with iterative parameter changes until a satisfactory resulting shape for the reflecting waveguides provides the optimum energy flux distribution for the given task. In the alternative, a loop may be incorporated into the computer program that adjusts selected variables to optimize the result.

EXAMPLE I

Figure 3:
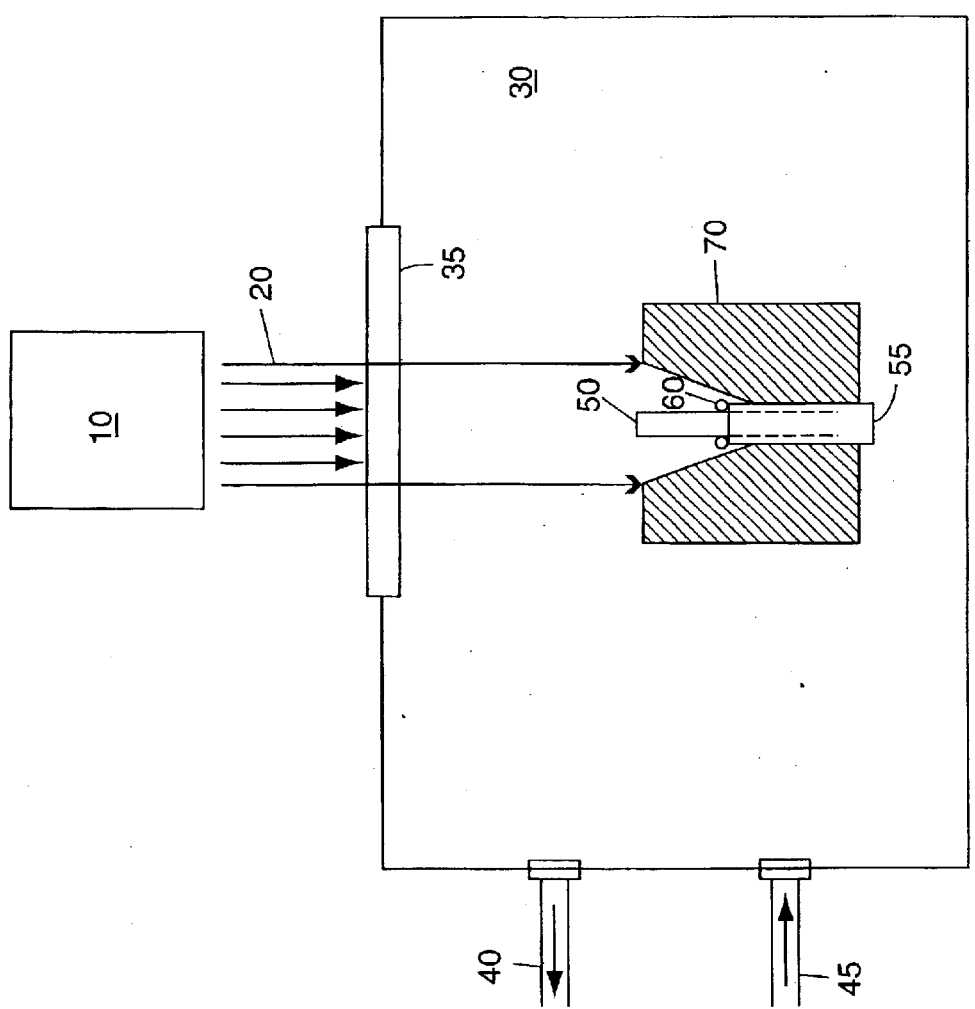
FIG. 3 is a pictorial illustration of the initial setup using a conical waveguide for conducting optimization of brazing in Example 1.
Figure 4:
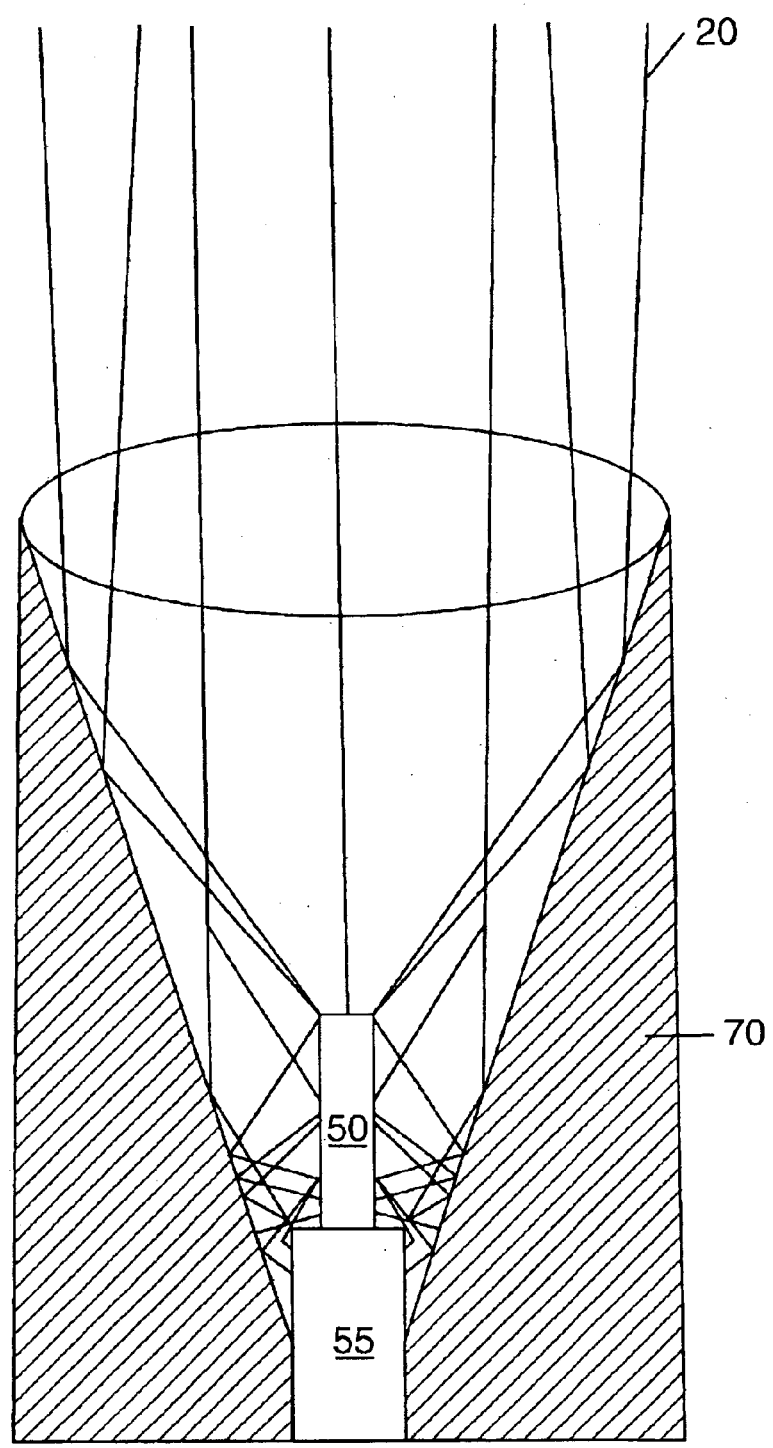
FIG. 4 is a pictorial illustration of the infrared rays reflecting and dissipating energy within the conical waveguide in Example 1.

The method has been tested by brazing two tubes together with satisfactory results. The set-up configuration is pictorially illustrated in FIG. 3 and involved placing one tube within the end of a slightly larger tube. Two tests were performed: in one test a conical reflecting waveguide was used and in a second test a wedge shaped reflecting waveguide was used.

A Raytheon™ SS-500 400-watt average power pulsed Nd:YAG laser with hard optics beam delivery was used as an infrared energy source 10. The final focus lens was removed to allow the use of 0.4" diameter columinated laser beam 20.

Test chamber 30 was used to control the surrounding environmental parameters. Test chamber 30 comprised a stainless steel box with 2" diameter quartz glass window 35. Roughing pump port 40 and process atmosphere inlet 45 were provided to allow the pump down and backfill of chamber 30 to reduce the oxygen and moisture content processing levels acceptable to result in the quality of braze desired. Argon gas with a 6% hydrogen mixture, commercially available as welding gas, was used to shield the molten braze material from oxygen and to create a partially active braze environment where the hydrogen gas reacted with residual surface oxides to help clean the joint and improve molten metal wetting.

The tubes 50 and 55 to be brazed in each run were 304 stainless steel, first tube 50 with a 0.063-inch (1.6 mm) outside diameter and second tube 55 with a 0.125-inch (3.18 mm) outside diameter. Smaller tube 50 was placed concentrically within larger tube 55, resulting in a concentric gap of approximately 0.005 inches (0.127 mm).

Braze material 60 was 0.025 inch (0.635 mm) diameter Nioro™ (Au-18% Ni) wire cut and formed into 2 rings. Both the tubes and rings were cleaned using alkali cleaner followed by de-ionized water rinsing, and were given a final rinse in high purity ethanol immediately prior to assembly and brazing.

The reflecting waveguides selected were polished copper. Conical-shaped reflecting waveguide 70 used in the first test is shown. The V-shaped waveguide used in the second test was similar to that depicted in FIG. 2.

Models were run on a Pentium III laptop running Windows NT using an OptiCad™ optical ray tracing software package. The models employed non-sequential ray tracing, which allowed a ray to impact any surface in any order. To obtain an adequate statistical representation of energy propagation, 10,000 rays were traced as emanating from a region of space defined by a distribution of point sources of rays representing the actual distributed heat source object of the collimated laser beam source.

The reflective surfaces of the copper waveguides were defined to have a reflective coefficient of 98%. No energy absorption was recorded for the reflecting waveguide walls. The tube sections were defined to possess an energy absorption value of 35%, typical for Nd:YAG radiation on stainless steel, and conversely, a reflective value of 65%.

The tracing of 10,000 rays required approximately 2 minutes run time. The total energy input into the system is distributed evenly among the number of rays specified. In initial trials, variations in cone and V-block geometry, laser beam size and location, and tube joint location were made to develop a qualitative appreciation for the interaction of these parameters and a quantitative output of energy absorption versus position of the braze joint.

Energy output of the models was displayed by graphing the absorptive data using Microsoft™ EXCEL. Microsoft™ EXCEL software was also used to calculate total energy absorption by the tubes and to determine the uniformity of tube surface illumination.

The tubular test samples with braze alloy ring preforms were placed within the reflecting waveguide at locations indicated by the preliminary model results. The tubular test samples within the reflecting waveguides were then positioned beneath the test chamber window to allow direct delivery of the laser beam into the reflecting waveguide.

When the conical reflecting waveguide was used, the final focusing lens of the laser was not used, thereby allowing the approximately 0.4-inch (10 mm) beam to pass through the test chamber window directly into the conical reflecting waveguide. Omitting the final focusing lens of the laser eliminated one variable from the system, i.e., that of laser focal length, and allowed greater access to the experimental setup.

When the V-block shaped reflecting waveguide was used, a beam aperture external to the laser cavity was used to reduce the diameter of the beam in order to reduce the extent of braze joint illumination and heating.

Various cone and V-block angles were modeled. Focused and collimated beams at various locations and of various diameters were also modeled. The position of the tube joint within the reflecting waveguide was also modeled.

The model predicted that a part location with the center of the tubes 0.35 inches (8.9 mm) from the bottom of the V-block would result in the most even circumferential illumination around the joint circumference.

The parameters used to perform the brazes are given in Table 1.

TABLE 1

Laser and Process Parameters

| Parameter | Conical reflecting waveguide | V-block reflecting waveguide |
|---|---|---|
| laser power | 75 W | 75 W |
| pulse length | 7.2 msec | 7.2 msec |
| repetition rate | 50 pps | 50 pps |
| beam diameter | 3 mm | 10 mm |
| beam aperture | 0.170 inch | none |
| shield gas | argon/6% hydrogen | argon/6% hydrogen |
| illumination time | 80–100 sec | 30 sec |

Braze illumination was initiated, watched to observe braze wetting and flow, then ended. The tubes were observed to heat rapidly and evenly all the way to brazing temperature within 100 seconds in the case of the cone shaped reflecting waveguide and 30 seconds in the case of the V-block shaped reflecting waveguide at 75 W incident power.

A control run was made without a reflecting waveguide using only direct laser beam energy impingement. Without the reflecting waveguide, the tubes failed to reach brazing temperatures regardless of the duration of energy input at 75 W incident power.

Samples were visually inspected, helium-leak checked to ensure hermeticity, macro photographed, and metallographically examined using standard procedures.

The ray tracing models proved useful in visualization of energy impingement as a function of reflecting waveguide geometry, tube joint location and energy source geometry.

With the non-optimized placement of the tubes within the V-block reflecting waveguide, as shown in FIG. 2, energy flux concentrated below the tubes rather than impinging on the tubes in an evenly distributed pattern. An optimized placement of the tubes within the V-block reflecting waveguide as determined through the method resulted in placement where there was even illumination on all sides of the tubes by direct and reflected rays providing for maximum energy absorption by the tubes.

Brazes optimized in accordance with the method displayed a bright, smooth, even and continuous fillet around the circumferences of the joints. The cross-sections showed good, continuous wetting and capillary flow within the braze joint, with no indication of overheating or intermetallic formation. The as-received microstructure of the tubing showed no alteration or detrimental effects on grain size due to the short thermal cycles achieved by the practice of this invention. No alternation to the surface of the tubing such as localized melting or oxidation due to direct beam impingement was observed. Liquid metal embrittlement of the base material which can result from overheating due to excessive energy intensity or duration was also avoided by use of the method.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A computer implemented method for designing energy deposition of infrared energy in order to braze two or more objects together, said method comprising:
   selecting said objects to be coupled through brazing and establishing initial conditions of relative geometry and material characteristics,
   determining a first design of an optical system for directing heat energy onto said objects,
   inputting said relative geometry and said first design of said optical system into an optical ray-tracing computer program to output a representation of heat energy input over said objects,
   adjusting said geometry and material characteristics of said objects, and optical system design until a desired heat input representation over said objects is obtained.

2. The computer implemented method of claim 1, wherein establishing initial conditions includes:
   determining a relative geometry between said objects,
   determining a braze joint geometry,
   selecting a braze filler material,
   determining an initial time and temperature energy deposition profile based on said material characteristics, and
   selecting a desired atmospheric environment.

3. The computer implemented method of claim 1, wherein determining said first design of optical system includes:

selecting a non-imaging infrared energy source, and selecting a waveguide configuration of one or more waveguides to direct said energy source.

4. The computer implemented method of claim 1, wherein adjusting said geometry and material characteristics of said objects and optical system design, includes providing at least one change of:

infrared energy source;

waveguide material of said one or more waveguides; and configuration of said one or more waveguides.

5. A computer implemented method for designing energy deposition of infrared energy in order to thermally treat an object, said method comprising:

selecting said object to be thermally treated and establishing initial conditions of relative geometry and material characteristics, determining a first design of an optical system for directing heat energy onto said object, inputting said relative geometry and said first design of said optical system into an optical ray-tracing computer program to output a representation of heat energy input over said object, adjusting said geometry and material characteristics of said objects, and optical system design until a desired heat input representation over said object is obtained.

6. The computer implemented method of claim 5, wherein establishing said initial conditions includes:

determining an initial time and temperature energy deposition profile based on said material characteristics, and selecting a desired atmospheric environment.

7. The computer implemented method of claim 5, wherein determining said first design of an optical system, includes:

selecting a non-imaging infrared energy source, and selecting a waveguide configuration of one or more waveguides to direct said energy source.

8. The computer implemented method of claim 5, wherein adjusting said geometry and material characteristics of said objects, and optical system design, includes providing at least on change of:

infrared energy source;

waveguide material of said one or more waveguides; and configuration of said one or more waveguides.

\* \* \* \* \*